US012786398B2

(12) United States Patent
Wang et al.

(10) Patent No.: US 12,786,398 B2
(45) Date of Patent: Nov. 3, 2026

(54) SECONDARY TRANSFORM SET SELECTION

(71) Applicant: Tencent America LLC, Palo Alto, CA (US)

(72) Inventors: Biao Wang, Palo Alto, CA (US); Xin Zhao, Palo Alto, CA (US); Madhu Peringassery Krishnan, Palo Alto, CA (US); Roman Chernyak, Palo Alto, CA (US); Lien-Fei Chen, Palo Alto, CA (US); Shan Liu, Palo Alto, CA (US); Yonguk Yoon, Palo Alto, CA (US); Motong Xu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 19/014,077

(22) Filed: Jan. 8, 2025

(65) Prior Publication Data

US 2025/0227232 A1 Jul. 10, 2025

Related U.S. Application Data

(60) Provisional application No. 63/619,715, filed on Jan. 10, 2024.

(51) Int. Cl.
*H04N 19/12* (2014.01)
*H04N 19/159* (2014.01)
(Continued)

(52) U.S. Cl.
CPC ........... *H04N 19/12* (2014.11); *H04N 19/159* (2014.11); *H04N 19/176* (2014.11); *H04N 19/61* (2014.11); *H04N 19/70* (2014.11)

(58) Field of Classification Search
CPC .... H04N 19/12; H04N 19/159; H04N 19/176; H04N 19/61; H04N 19/70; H04N 19/11
See application file for complete search history.

(56) References Cited

U.S. PATENT DOCUMENTS

2019/0238839 A1* 8/2019 Ikeda .................... H04N 19/11
2020/0204814 A1* 6/2020 Yoo ........................ H04N 19/11
(Continued)

FOREIGN PATENT DOCUMENTS

WO WO 2023131299 A1 7/2023

OTHER PUBLICATIONS

AOMedia Video 1 (AV1), "Signaled Transform Set", Retrieved from the Internet: https://aomedia.org/specifications/av1/, 6 pgs.
(Continued)

*Primary Examiner* — Jared Walker
(74) *Attorney, Agent, or Firm* — Morgan, Lewis & Bockius LLP

(57) ABSTRACT

An example method of video coding includes receiving a video bitstream comprising a current block and a syntax element and identifying an intra prediction mode for the current block. The method also includes parsing the syntax element to determine whether to change the intra prediction mode when deriving a transform set index, and deriving the transform set index for the current block based on the intra prediction mode and the parsed syntax element. The method further includes selecting a first transform set from a plurality of transform sets according to the transform set index, and reconstructing the current block using the first transform set.

20 Claims, 7 Drawing Sheets

(51) Int. Cl.

| | |
|---|---|
| ***H04N 19/176*** | (2014.01) |
| ***H04N 19/61*** | (2014.01) |
| ***H04N 19/70*** | (2014.01) |

(56) References Cited

U.S. PATENT DOCUMENTS

| | | | | |
|---|---|---|---|---|
| 2020/0213602 | A1* | 7/2020 | Takehara | H04N 19/176 |
| 2021/0409762 | A1* | 12/2021 | Zhao | H04N 19/157 |
| 2022/0132134 | A1* | 4/2022 | Koo | H04N 19/132 |
| 2024/0179303 | A1* | 5/2024 | Park | H04N 19/176 |
| 2024/0214596 | A1* | 6/2024 | Yu | H04N 19/12 |

OTHER PUBLICATIONS

Tencent America LLC, ISRWO, PCT/US2025/011201, Mar. 17, 2025, 10 pgs.

* cited by examiner

SECONDARY TRANSFORM SET SELECTION

RELATED APPLICATIONS

This application claims priority to U.S. Provisional Patent Application No. 63/619,715, entitled "Improving LFNST/NSPT with Selective Transform Set," filed Jan. 10, 2024, which is hereby incorporated by reference in its entirety.

TECHNICAL FIELD

The disclosed embodiments relate generally to video coding, including but not limited to systems and methods of selecting secondary transform sets.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released. Enhanced Compression Model (ECM) is a video coding standard that is currently under development. ECM aims to significantly improve compression efficiency beyond existing standards like HEVC/H.265 and VVC, essentially allowing for higher quality video at lower bitrates.

SUMMARY

The present disclosure describes, amongst other things, a set of techniques for video (image) compression related to intra prediction modes and transform set selection for corresponding residual blocks. Some embodiments include identifying a transform set based on the intra prediction mode (and optionally a signaled offset to the intra prediction mode). In some embodiments, an index is derived for a selected transform set from a plurality of transform sets. An advantage of selecting the transform set based on the intra prediction mode is improved coding accuracy (as opposed to using a same transform set regardless of intra prediction mode). In some embodiments, the index (and/or other transform information) is selectively signaled (e.g., when a non-separable primary transform (NSPT) or a low frequency non-separable transform (LFNST) is enabled for a block). An advantage of conditionally signaling the transform set information is decreased signaling cost (as opposed to always signaling the transform set information).

In accordance with some embodiments, a method of video decoding includes: (i) receiving a video bitstream (e.g., a coded video sequence) comprising a current block and a syntax element; (ii) identifying an intra prediction mode for the current block; (iii) parsing the syntax element to determine whether to change the intra prediction mode when deriving a transform set index; (iv) deriving the transform set index for the current block based on the intra prediction mode and the parsed syntax element; (v) selecting a first transform set from a plurality of transform sets according to the transform set index; and (vi) reconstructing the current block using the first transform set.

In accordance with some embodiments, a method of video encoding includes (i) receiving video data (e.g., a source video sequence) comprising a plurality of blocks (e.g., corresponding to a set of one or more pictures) including a current block; (ii) identifying an intra prediction mode for the current block; (iii) determining whether to change the intra prediction mode when deriving a transform set index; (iv) deriving the transform set index for the current block based on the intra prediction mode and the determination as to whether to change the intra prediction mode; (v) selecting a first transform set from a plurality of transform sets according to the transform set index; and (vi) encoding the current block using the first transform set.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder). In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes video/image compression techniques including selecting a transform set from among multiple transform sets based on coded information for a current block. Selecting an appropriate transform set from among multiple transform sets can improve coding accuracy as compared to using a single transform set for all blocks. The coded information may include a prediction mode for the current block. For example, selecting the transform set may include deriving a transform set index for a current block. The transform set index may be based on an intra prediction mode for the current block and a signaled adjustment (e.g., identified via a parsed syntax element). A first transform set from a plurality of transform sets may be selected according to the transform set index. In some embodiments, the transform set index and/or the adjustment (e.g., an intra prediction mode offset or transform index offset) is conditionally signaled based on a coding of the current block (e.g., a prediction mode of the current block, a transform mode for the current block, and/or other coding information for the current block). Conditionally signaling the transform set index and/or the adjustment improves signaling cost for the video bitstream as compared to always signaling the information.

Example Systems and Devices

Figure 1:
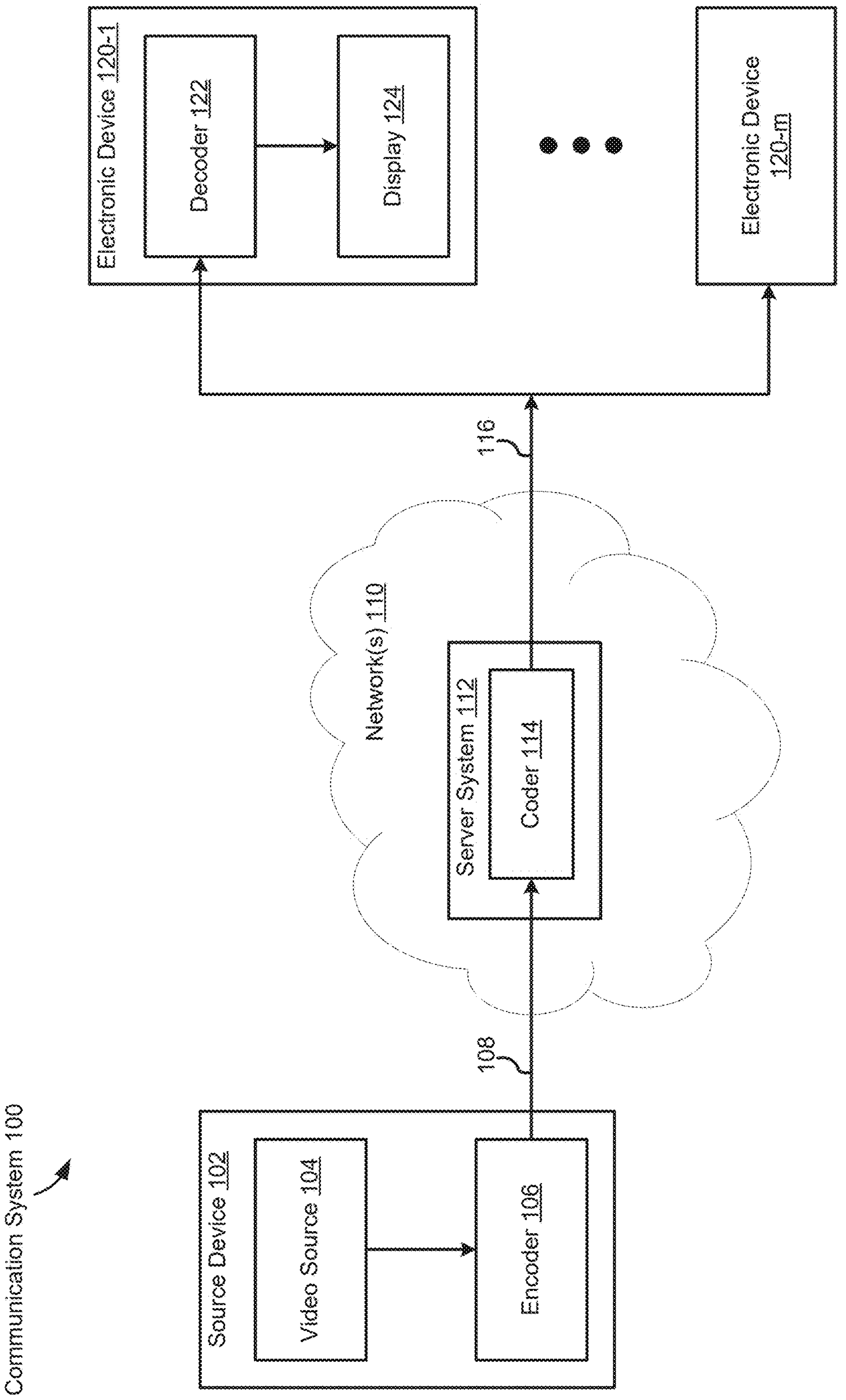
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
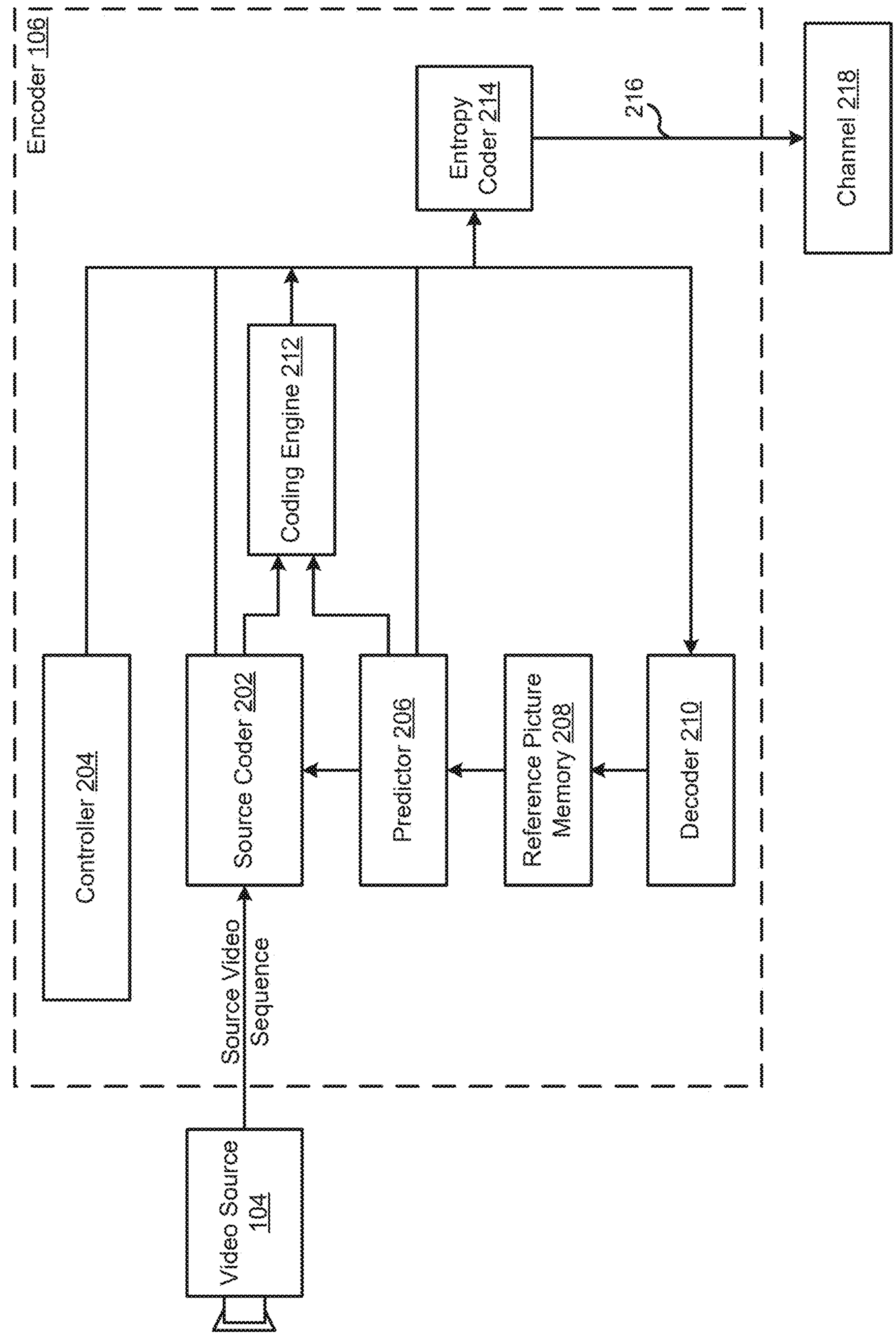
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
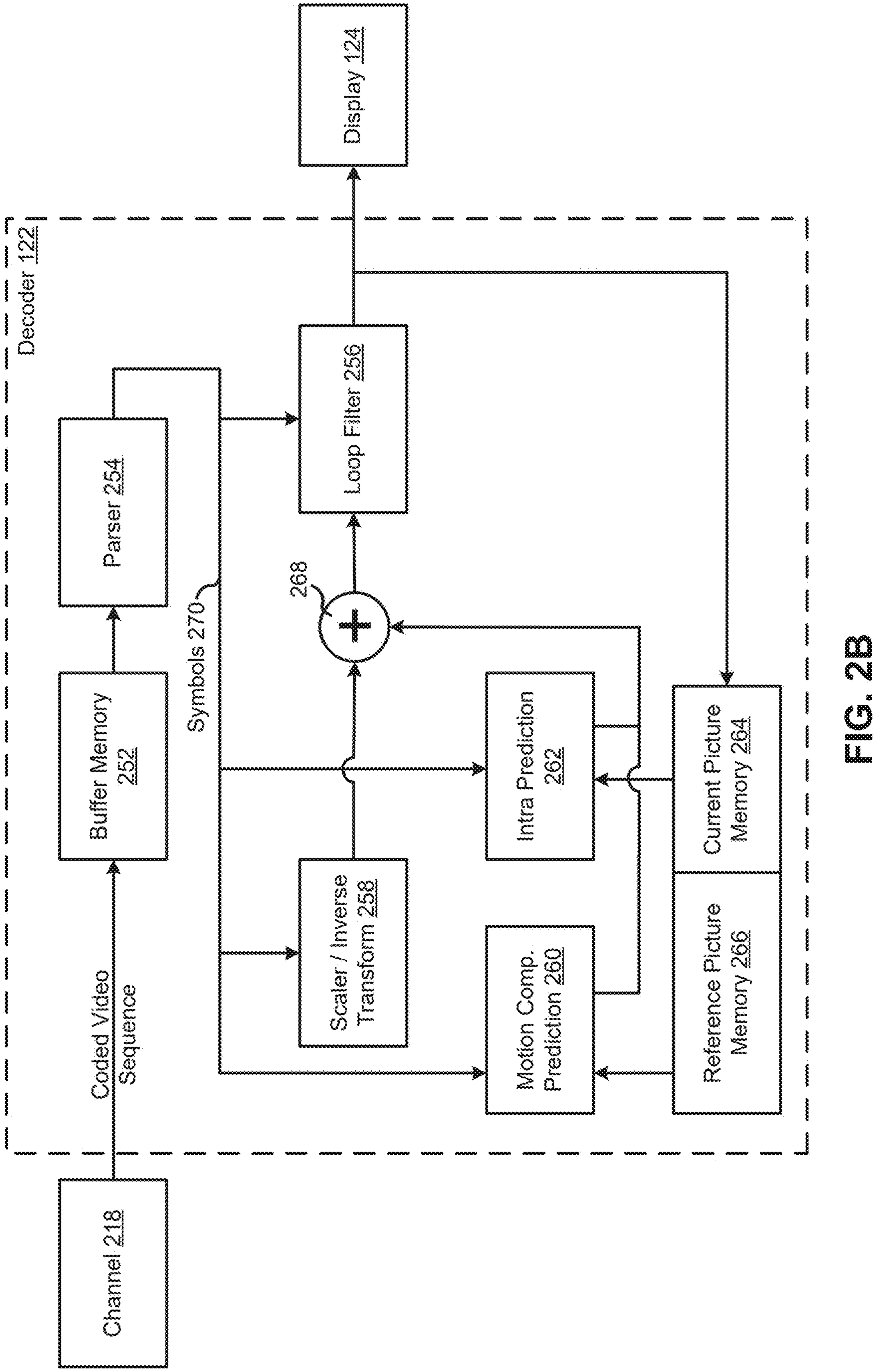
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when sub-sample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
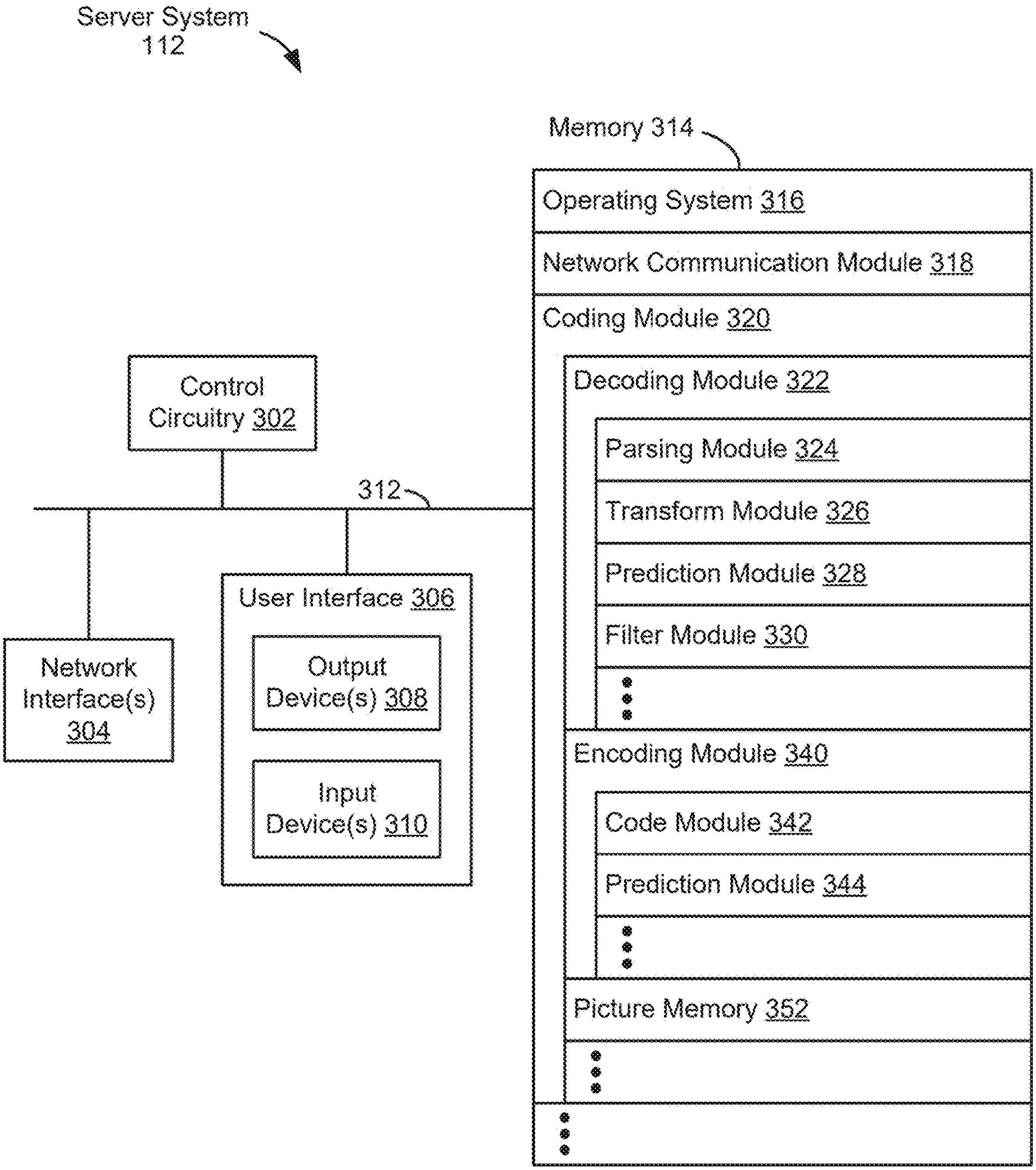
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

EXAMPLE CODING TECHNIQUES

The coding processes and techniques described below may be performed at the devices and systems described above (e.g., the source device 102, the server system 112, and/or the electronic device 120). According to some embodiments, methods for using selective transform sets are described below.

As discussed above, a block may refer to a coding tree block, the largest coding block, a pre-defined fixed block size, a coding block, a prediction block, a residual block, or a transform block. An inter mode coded block (or inter block) refers to a block using a inter prediction mode or combined intra-inter prediction mode. An inter mode may also refer to a block that is coded using a block vector that is used to fetch a prediction block within the same frame, e.g., using intra block copy. An intra mode coded block (or intra block) refers to a block using an intra prediction mode or a combined intra-inter prediction mode. An intra mode list may correspond to a list of most probable intra prediction modes for a current block. Additionally, the term "partitioning" may correspond to block partitioning or transform partitioning.

As an example, a coding tree unit (CTU) may be split into coding units (CUs) by using a quad-tree structure denoted as a coding tree to adapt to various local characteristics. In some embodiments, the decision on whether to code a picture area using inter-picture (temporal) or intra-picture (spatial) prediction is made at the CU level. Each CU can be further split into one, two, or four prediction units (PUs) according to the PU splitting type. Inside a PU, the same prediction process is applied, and the relevant information may be transmitted to the decoder on a PU basis. After obtaining the residual block by applying the prediction process based on the PU splitting type, a CU can be partitioned into transform units (TUs) according to another quad-tree structure like the coding tree for the CU.

A quad-tree with nested multi-type tree using binary and ternary splits segmentation structure may be used to replace the concepts of multiple partition unit types. In the coding tree structure, a CU can have either a square or rectangular shape. A CTU is first partitioned by a quaternary tree structure. The quaternary tree leaf nodes can be further partitioned by a multi-type tree structure. An example multi-type tree structure includes four splitting types. The multi-type tree leaf nodes are called CUs, and unless the CU is too large for the maximum transform length. This means that, the CU, PU, and TU may have the same block size in the quad-tree with a nested multi-type tree coding block structure.

The coding tree scheme supports the ability for the luma and chroma to have a separate block tree structure, such as in VTM7. In some cases, for P and B slices, the luma and chroma CTBs in one CTU share the same coding tree structure. However, for I slices, the luma and chroma can have separate block tree structures. When a separate block tree mode is applied, a luma CTB is partitioned into CUs by one coding tree structure, and the chroma CTBs are partitioned into chroma CUs by another coding tree structure. This means that a CU in an I slice may include, or consist of, a coding block of the luma component or coding blocks of two chroma components, and a CU in a P or B slice may always include, or consist of, coding blocks of all three color components unless the video is monochrome.

Turning now to transforms and transform blocks, the transforms performed during decoding of the video bitstream may be inverses of the transformed performed during encoding of the video bitstream, and are sometimes referred to as "inverse transforms". Notably, while the encoder component applies transforms, the decoder component performs the inverse transforms. Thus, in the description below, transforms described in the context of the decoder component may be the inverse of the transforms applied on the encoder side. For simplicity, the transformations described herein may be referred to as "transforms" whether performed during encoding or decoding.

Multiple transform sizes (e.g., ranging from 4-point to 64-point for each dimension) and transform shapes (e.g., square or rectangular with width/height ratio's 2:1/1:2 and 4:1/1:4) may be utilized. As described in further detail below, a transform may correspond to a primary or secondary transform and to a separable or non-separable transform. A transform set is a grouping of one or more transform types. Thus, a transform set indicates a group of multiple transform kernels/bases, and one transform kernel/bases. Each entry in the transform set may be referred to as a transform candidate. For each block, a transform candidate selected from a transform set may be signaled or implicitly identified.

Some embodiments include methods for signaling a transform set and/or type selection for intra and/or inter coded blocks. A transform type may belong to the family of sinusoidal transforms, KLTs, or line-graph transforms (LGT). A (primary or secondary) transform may belong to the family of sinusoidal transforms (DCT's, DST's, flipped versions of DCT's and ADST's). DCT may refer to any transforms that use a transform kernel originating from the discrete cosine transform basis, and DST/ADST may refer to any transforms that use a transform kernel originating from the discrete sine transform basis.

An example primary transform may belong to the family of generalized line graph transforms (LGT) or it may be a training-based kernel. An example secondary transform set may be a grouping of one or more non-separable secondary transform kernel transform types. Unique or common secondary transform sets may be defined for each primary transform type, and/or intra or inter mode type.

Additionally, non-separable transforms can refer to primary transforms applied directly to residuals, or secondary transforms applied on the transform coefficient blocks produced by the primary transform. Transform kernels can be grouped into sets denoted by set indices and kernel indices within a set. Non-separable secondary transforms may be trained kernels applied to primary transform coefficients at the encoder or dequantized coefficients at the decoder.

A non-separable secondary transform kernel can be considered as a collection of basis vectors in a vector space. If represented as a matrix of size M×N (M rows and N columns), N corresponds to the dimension of vector space and M the number of bases. Thus, M×N can be used to represent kernel size. Examples of kernel sizes include, but are not limited to, 64×64 samples, 32×64 samples, 16×64 samples, 8×84 samples, 4×64 samples, 16×16 samples, 8×16 samples, 4×16 samples, 8×8 samples, and 4×4 samples.

A scanning order refers to the coefficient reorganization process that maps a two-dimensional primary transform coefficient array to a one-dimensional primary transform coefficient array as the input the forward secondary transform, it can also refer to the backward coefficient reorganization process that maps a one-dimensional secondary transform coefficient array back to a two-dimensional primary transform coefficient array.

An end of block (EOB) value corresponds to the position of the last significant coefficient following a given coefficient scanning order in a coded block. The EOB value may correspond to the position of the last significant (e.g., non-zero) coefficient following a given coefficient scanning order in a coded block. All coefficients in positions beyond the EOB are zero for a given coefficient scanning order. In some embodiments, if a non-separable secondary transform kernel of size M×N is applied to a coded block, the EOB value is ≤M.

A two-dimensional transform process may involve the use of hybrid transform kernels (e.g., composed of different one-dimensional transforms for each dimension of the coded residual block). Primary one-dimensional transforms may include at least one of a) 4-point, 8-point, 16-point, 32-point, 64-point discrete cosine transform; b) 4-point, 8-point, 16-point asymmetric discrete sine transforms and their flipped versions; or c) 4-point, 8-point, 16-point, 32-point identity transforms.

For a chroma component, the transform type selection may be performed in an implicit way. For intra prediction residuals, the transform type may be selected according to the intra prediction mode. For inter prediction residuals, the transform type may be selected according to the transform type selection of the co-located luma block. Therefore, for chroma component, no transform type signaling in the bitstream may be needed.

Figure 4A:
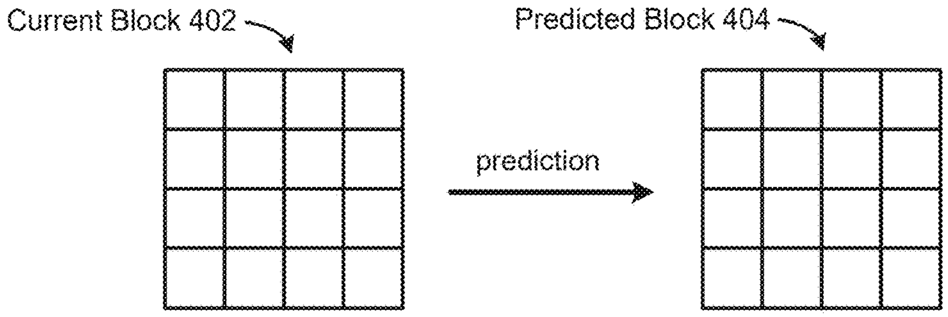
FIGS. 4A-4C illustrate example prediction blocks, residual blocks, and reconstructed blocks according to some embodiments.
Figure 4B:
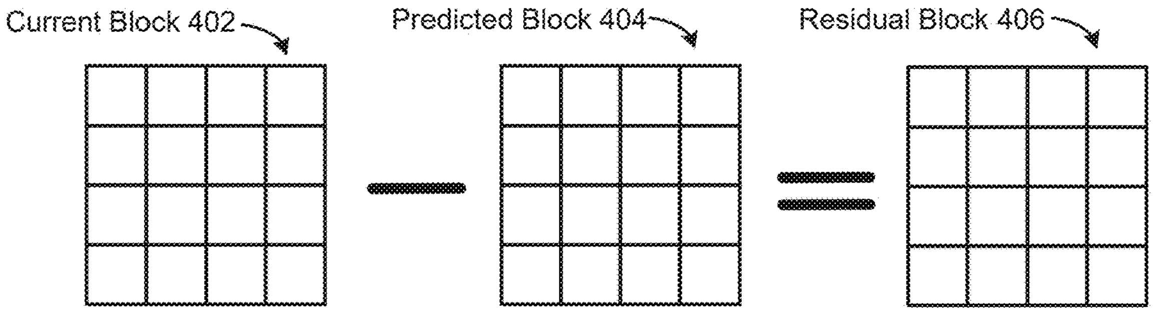
Figure 4C:
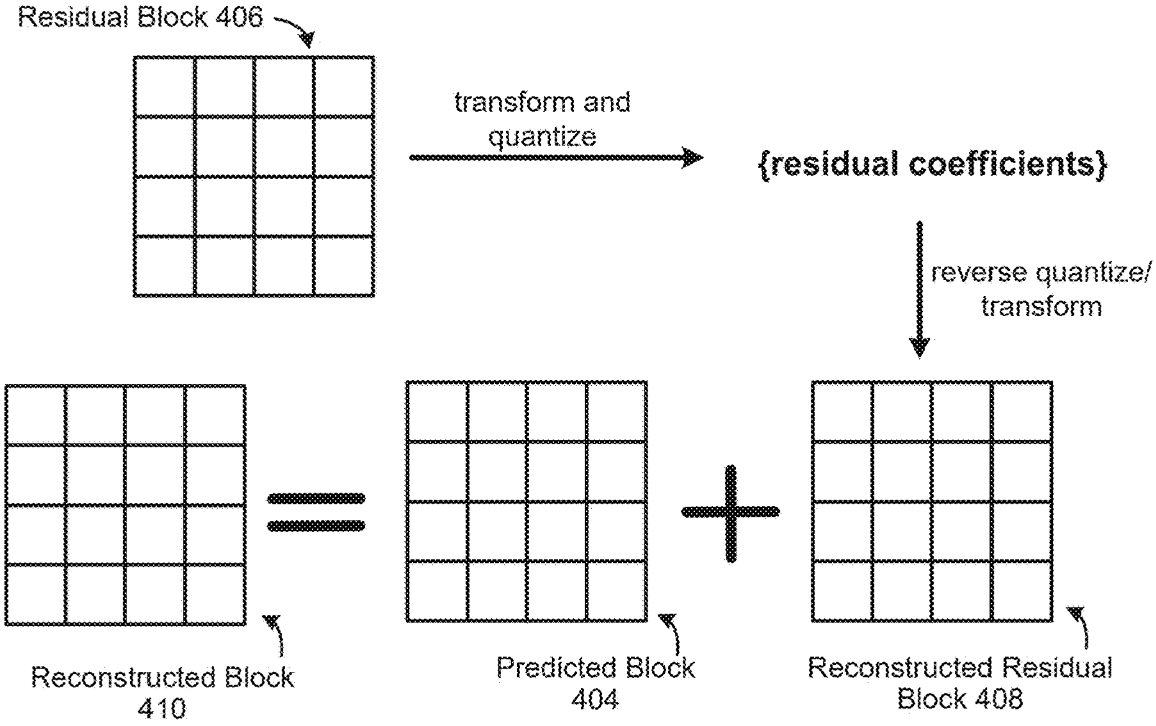

Turning now to example encoding and decoding using prediction and residual blocks, FIG. 4A illustrates the computation of a prediction block in accordance with some embodiments. In the example of FIG. 4A, an intra prediction is performed on a current block 402 to generate a predicted block 404. In some embodiments, an inter prediction is performed to generate the predicted block. The current block 402 includes a set of samples (e.g., pixel blocks) and the prediction block 404 includes a set of predictions that correspond to the set of samples. FIG. 4B illustrates the computation of a residual block in accordance with some embodiments. As shown in FIG. 4B, the prediction block 404 is subtracted from the current block 402 to generate a residual block 406 that includes a set of residues. For example, respective differences are calculated between each sample and the corresponding prediction. FIG. 4C illustrates the computation of a reconstructed block in accordance with some embodiments. As shown in FIG. 4C, the residual block 406 undergoes one or more transformations and quantization to generate a set of residual coefficients. The set of residual coefficients may be transmitted from an encoder component to a decoder component. The set of residual coefficients undergo a reverse quantization and reverse transformation to generate a reconstructed residual block 408. The reconstructed residual block 408 is combined with the predicted block 404 (e.g., reconstructed residues of the reconstructed residual block 408 are added to predictions of the prediction block 404) to generate a reconstructed block 410 corresponding to the current block 402.

Figure 5A:
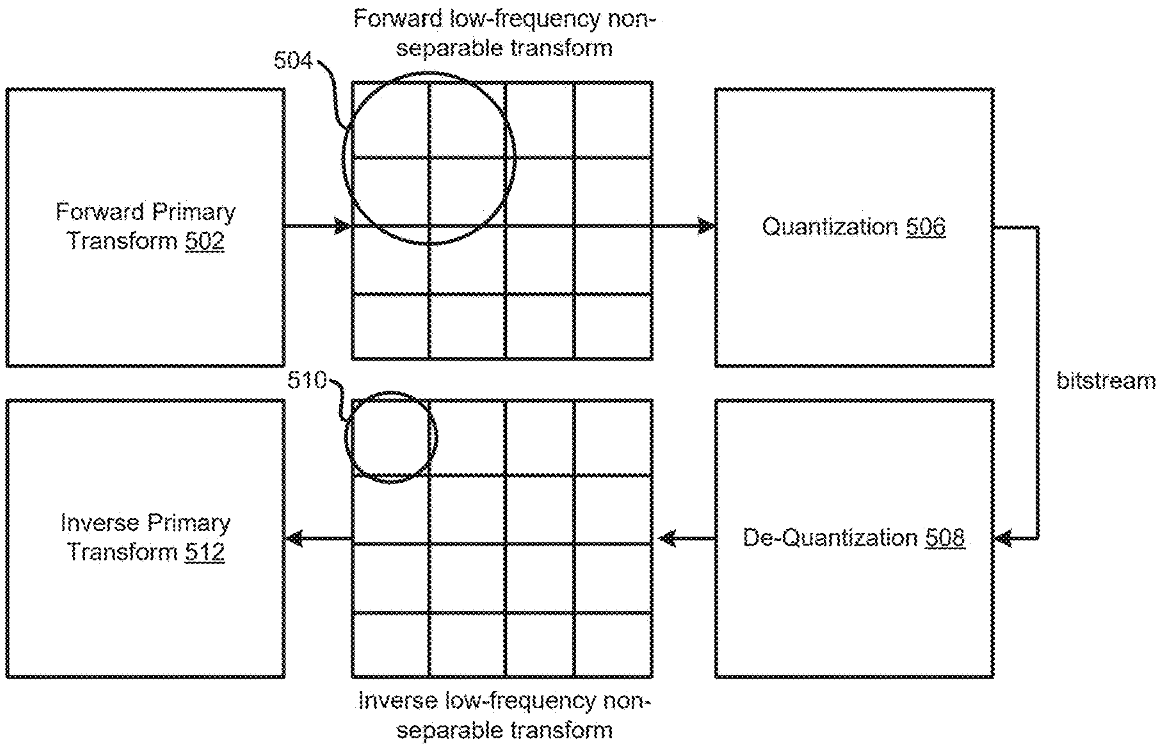
FIG. 5A illustrates an example low-frequency non-separable transform process in accordance with some embodiments.

FIG. 5A illustrates an example low-frequency non-separable transform (LFNST) process in accordance with some embodiments. An LFNST is also known as a Reduced Secondary Transform (RST). The LFNST may be applied between a forward primary transform 502 and quantization 506 (e.g., at an encoding component) and between de-quantization 508 and an inverse primary transform 512 (e.g., at a decoding component) as shown in FIG. 5A.

An example LFNST 504 that may include 16 input coefficients for a 4×4 forward LFNST or 64 input coefficients for an 8×8 forward LFNST. In an example LFNST, a 4×4 non-separable transform or an 8×8 non-separable transform is applied according to block size. For example, a 4×4 LFNST may be applied for small blocks (e.g., with a width or height that is less than 8 samples) and an 8×8 LFNST may be applied for larger blocks (e.g., with a width or height that is greater than 4 samples). An example LFNST 510 may include 8 input coefficients for a 4×4 inverse LFNST or 16 input coefficients for an 8×8 inverse LFNST.

As an example, there may be 4 transform sets and 2 non-separable transform matrices (kernels) per transform set that are used in LFNST. The mapping from the intra prediction mode to the transform set may be predefined as shown in in Table 1 below. If one of three CCLM modes (INTRA_LT_CCLM, INTRA_T_CCLM or INTRA_L_CCLM) is used for the current block (81<=IntraPredMode<=83), the transform set 0 is selected (e.g., for a current chroma block). For each transform set, the selected non-separable secondary transform candidate may be further specified by an explicitly signaled LFNST index. The index may be signaled in a bitstream once per Intra CU (e.g., after transform coefficients).

TABLE 1

Transform Selection Table

| Intra Prediction Mode | Transform set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

The LFNST described above may be adjusted as follows. First, more transform sets may be used for a finer granularity of directions (e.g., 35 transform sets instead of 4). Second, more transform kernels may be included in each set (e.g., 3 transform kernels instead of 2). Third, three different kernels (e.g., LFNST4, LFNST8, and LFNST16) may be defined to indicate LFNST kernel sets, which may be applied to 4×N/N×4 (N≥4), 8×N/N×8 (N≥8), and M×N (M, N≥16), respectively. Fourth, the LFNST set (LFNST_set_idx) for a given intra mode (Intra_pred_mode) may be derived according to a different formula, such as shown in Table 2.

In another example, for Intra_pred_mode<2, LFNST_set_idx is equal to 2, LFNST_set_idx=Intra_pred_mode, for Intra_pred_mode in [0,34], and LFNST_set_idx=68 −Intra_pred_mode, for Intra_pred_mode in [35,66].

A non-separable primary transform (NSPT) may be used to replace the separable DCT-II plus LFNST transform combinations, e.g., for the block shapes of 4×4, 4×8/8×4, 4×16/16×4, 8×8, 8×16/16×8, 4×32/32×4, and 8×32/32×8. The NSPT set index for a given intra mode may also be derived based on Table 2.

TABLE 2

Mapping between Intra Mode and LFNST Set Index

| Intra Prediction Mode | LFNST Set Index |
|---|---|
| −14 | 2 |
| −13 | 2 |
| −12 | 2 |
| −11 | 2 |
| −10 | 2 |
| −9 | 2 |
| −8 | 2 |
| −7 | 2 |
| −6 | 2 |
| −5 | 2 |
| −4 | 2 |
| −3 | 2 |
| −2 | 2 |
| −1 | 2 |
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | 22 |
| 23 | 23 |
| 24 | 24 |
| 25 | 25 |
| 26 | 26 |
| 27 | 27 |
| 28 | 28 |
| 29 | 29 |
| 30 | 30 |
| 31 | 31 |
| 32 | 32 |
| 33 | 33 |
| 34 | 34 |
| 35 | 33 |
| 36 | 32 |
| 37 | 31 |
| 38 | 30 |
| 39 | 29 |
| 40 | 28 |
| 41 | 27 |
| 42 | 26 |
| 43 | 25 |
| 44 | 24 |
| 45 | 23 |
| 46 | 22 |
| 47 | 21 |
| 48 | 20 |
| 49 | 19 |
| 50 | 18 |
| 51 | 17 |
| 52 | 16 |
| 53 | 15 |
| 54 | 14 |
| 55 | 13 |

TABLE 2-continued

Mapping between Intra Mode and LFNST Set Index

| Intra Prediction Mode | LFNST Set Index |
|---|---|
| 56 | 12 |
| 57 | 11 |
| 58 | 10 |
| 59 | 9 |
| 60 | 8 |
| 61 | 7 |
| 62 | 6 |
| 63 | 5 |
| 64 | 4 |
| 65 | 3 |
| 66 | 2 |
| 67 | 2 |
| 68 | 2 |
| 69 | 2 |
| 70 | 2 |
| 71 | 2 |
| 72 | 2 |
| 73 | 2 |
| 74 | 2 |
| 75 | 2 |
| 76 | 2 |
| 77 | 2 |
| 78 | 2 |
| 79 | 2 |
| 80 | 2 |

In some embodiments, LFNST is restricted to be applicable only if all coefficients outside the first coefficient sub-group are non-significant. In these embodiments, LFNST index coding depends on the position of the last significant coefficient. The LFNST index may be context coded (e.g., not depending on the intra prediction mode). In some embodiments, only the first bin is context coded. In some embodiments, LFNST is applied for intra CU in both intra and inter slices, and for both luma and chroma components. If a dual tree is enabled, LFNST indices for luma and chroma components may be signaled separately. For inter slice (the dual tree is disabled), a single LFNST index may be signaled and used for both luma and chroma components.

In some embodiments, when an intra subpartition (ISP) mode is selected for a current block, LFNST may be disabled and RST index may not be signaled (e.g., because performance improvement may be marginal even if RST is applied to every feasible partition block). Additionally, disabling RST for ISP-predicted residual can reduce encoding complexity. LFNST may also be disabled (and the index not signaled) when a matrix-based intra prediction (MIP) mode is selected.

A large CU (e.g., greater than 64×64) may be implicitly split (TU tiling) due to existing maximum transform size restrictions (64×64). An LFNST index search could increase data buffering by four times for a certain number of decode pipeline stages. Therefore, the maximum size allowed for LFNST may be restricted (e.g., to 64×64). In some embodiments, LFNST is enabled with DCT2 only.

In some embodiments, separable transforms are applied on intra residual and inter residual samples. In some embodiments, an intra secondary transform (IST) scheme is customized for a video coding library (e.g., used for transforming intra residual blocks). The IST scheme can efficiently capture directional patterns in intra residual samples with lower complexity compared to non-separable primary transforms. In an IST scheme the nominal intra prediction angles can be used to categorize the IST kernels.

Figure 5B:
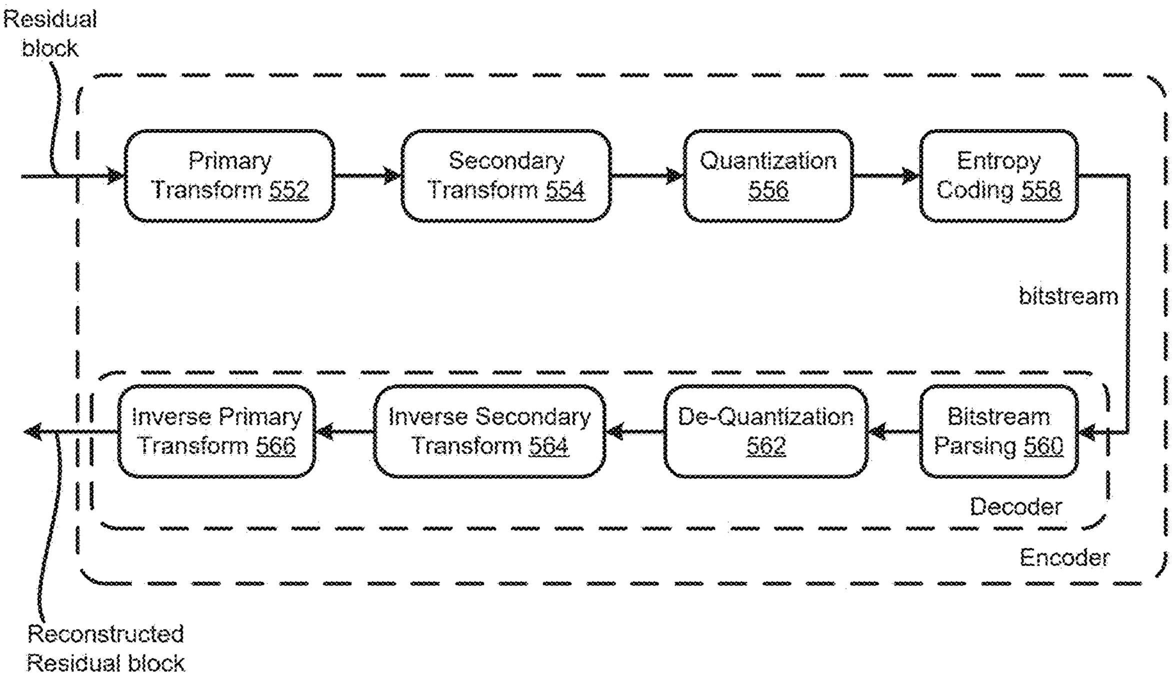
FIG. 5B illustrates an example transform process involving secondary transforms in accordance with some embodiments.

In some embodiments, a secondary transform method (e.g., IST) is applied to the primary transform coefficient block before applying quantization at the encoder (e.g., for intra prediction residual blocks of a luma component). Accordingly, a secondary inverse transform can be applied to a dequantized transform coefficient block before applying the inverse primary transform at the decoder. In some embodiments, IST is not applied to the chroma color components. The use of IST in the encoding and decoding process is illustrated in FIG. 5B. FIG. 5B shows a primary transform 552 being applied to a residual block (e.g., corresponding to a in intra prediction block). A secondary transform 554 is applied to the output of the primary transform 552. Quantization 556 is applied to the output of the secondary transform 554 and the resulting quantized coefficients are entropy encoded 558 and signaled via a video bitstream. The video bitstream is parsed 560 (e.g., at a decoder) and the quantized coefficients are de-quantized 562. An inverse secondary transform 564 is applied to the de-quantized data and an inverse primary transform 566 is applied to the output of the secondary transform 564. In this way, a reconstructed residual block is generated.

In some embodiments, 12 secondary transform sets (or IST sets) are defined, each containing 3 secondary transform kernels. In some embodiments, for each intra coded transform block, the nominal intra prediction mode and primary transform type may be identified, then the IST set is selected based on Table 3 below. In some embodiments, for Paeth prediction mode and recursive intra prediction modes, IST is neither applied nor signaled.

TABLE 3

Secondary transform set selection

| Intra Nominal Mode | Primary Transform Type | IST Set Index |
|---|---|---|
| DC_PRED | DCT Only | 0 |
| V_PRED | | 1 |
| H_PRED | | 1 |
| D45_PRED | | 2 |
| D135_PRED | | 3 |
| D113_PRED | | 4 |
| D157_PRED | | 4 |
| D203_PRED | | 5 |
| D67_PRED | | 5 |
| SMOOTH | | 6 |
| SMOOTH_V | | 1 |
| SMOOTH_H | | 1 |
| DC_PRED | ADST only | 7 |
| V_PRED | | 8 |
| H_PRED | | 8 |
| D45_PRED | | 9 |
| D135_PRED | | 10 |
| D113_PRED | | 11 |
| D157_PRED | | 11 |
| D203_PRED | | 12 |
| D67_PRED | | 12 |
| SMOOTH | | 13 |
| SMOOTH_V | | 8 |
| SMOOTH_H | | 8 |

Given an IST set with 3 kernels, there are four encoder options: 1) no secondary transform, 2) secondary transform using the first transform kernel in the given IST set, 3) secondary transform kernel using the second transform kernel in the given IST set, and 4) secondary transform kernel using the third transform kernel in the given IST set. The encoder may signal the selection using the using a syntax element (e.g., ist_idx). At the decoder, the value of syntax element is parsed, and, given the IST set and value associated with ist_idx, the secondary transform kernel is identified. The syntax element (ist_idx) may be signaled for each luma transform block after the signaling of primary transform type. For example, the signaling of ist_idx may be performed if at least one of the following is true: (i) the current block is an intra coded luma transform block, (ii) the primary transform type is DCT in both dimensions or ADST in both dimensions, (iii) the intra prediction mode is neither Paeth prediction mode nor recursive intra prediction mode, (iv) the transform partitioning depth is 0, and (v) the EOB position falls within the low-frequency transform coefficient region where secondary transform is applicable. In some embodiments, the entropy coding context for ist_idx is derived based on the transform block size. Conceptually, IST may be considered as another name for LFSNT. As one of skill in the art would appreciate, in the present disclosure, IST and LFNST may be replaceable for each other.

If an intra prediction mode is not smooth mode, or the intra prediction mode is generating prediction samples according to a given prediction direction, the intra prediction mode may be referred to as an angular or directional mode.

Figure 6A:
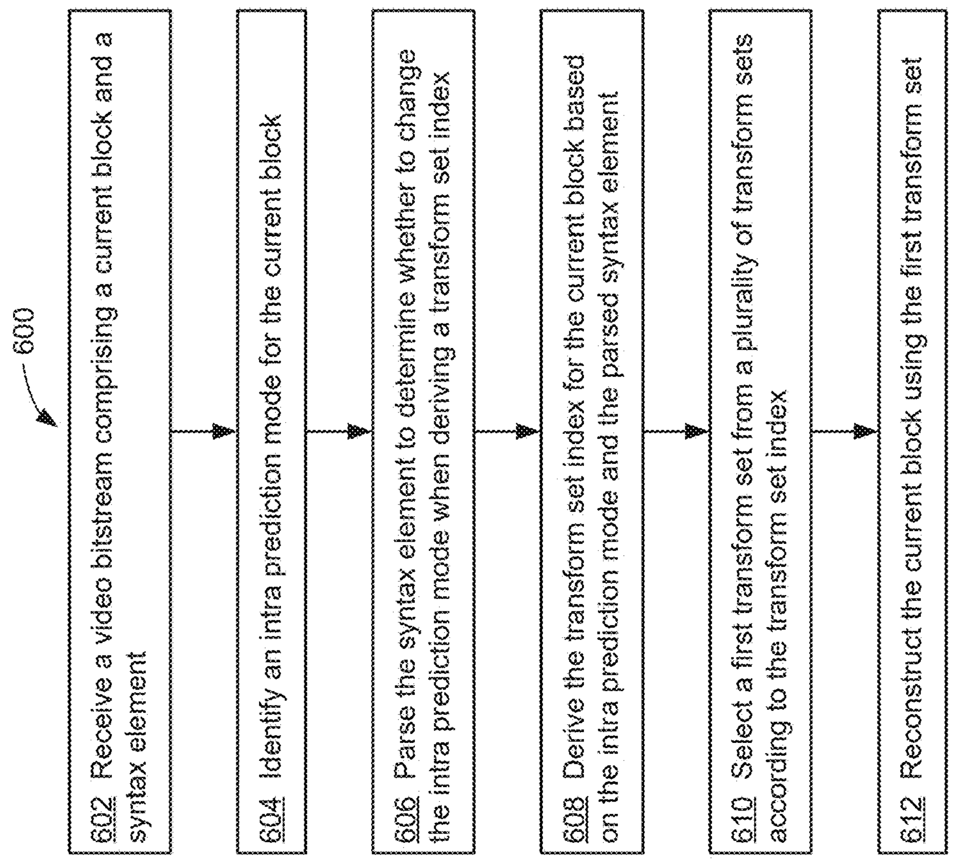
FIG. 6A illustrates an example video decoding process in accordance with some embodiments.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) a video bitstream comprising a current block and a syntax element. The system identifies (604) an intra prediction mode for the current block. The system parses (606) the syntax element to determine whether to change the intra prediction mode when deriving a transform set index. The system derives (608) the transform set index for the current block based on the intra prediction mode and the parsed syntax element. The system selects (610) a first transform set from a plurality of transform sets according to the transform set index. The system reconstructs (612) the current block using the first transform set. In this way, when selecting a transform set for a residual block, an index of the selected transform set (tx_set_idx) may be derived from multiple transform sets based on an intra prediction mode and a signaled offset to the intra prediction mode.

In some embodiments, a final intra prediction (N+M) is derived based on the signaled offset N and the existing intra prediction mode M, where M or N is a negative or positive integer number. Based on the final intra prediction mode, the tx_set_idx is derived based on a predefined mapping table, such as Table 2. As an example, the allowed number of signaled offsets may be limited to R, where R is a positive integer number. For example, when R is equal to 3, there are three allowed offsets, resulting in the selection of transform set is limited to three transform sets. As another example, the allowed number R may be adaptively determined based on coded information, such as the intra prediction mode, transform split mode/depth, transform coefficient values, last nonzero position (or EOB), the number of nonzero transform coefficients, and block width and height.

In some embodiments, the signaled offset is selected from a predefined set. For example, when the set is {−2, 0, 2}, the signaled offset value limits the selection of transform set to its neighboring transform set (with offset equals to −2, +2), or not use offset (with offset equal to 0). For example, the predefined set may be adaptively determined based on coded information, such as the intra prediction mode, transform split mode/depth, transform coefficient values, last nonzero position (or EOB), the number of nonzero transform coefficients, and block width and height.

In some embodiments, the final intra mode range is extended to [−15, 81], inclusive.

In some embodiments, the final intra mode is altered before mapping to the transform set to avoid duplicated mapping to the same transform set: (i) when the existing intra mode is between [−15, −1] and the offset is −2, the final intra mode is derived as 3; and (ii) when the existing intra mode is between [66, 81] and the offset is +2, the final intra mode is derived as 65.

In some embodiments the final intra mode is altered before mapping to the transform set to keep non-directional intra mode as non-directional transform set: (i) when the existing intra mode is equal to 0 and the offset is −2, the final intra mode is derived as 1; and (ii) when the existing intra mode is equal to 1 and the offset is −2, the final intra mode is derived as 0.

In some embodiments, the signaled intra mode offset is applied for both NSPT and LFNST.

In some embodiments, the signaled intra mode offset is entropy coded. For example, the entropy coding of intra mode is contexed coded and the context is built based on whether the current slice is dual tree or single tree.

In some embodiments, the signaling of the transform index and/or corresponding adjustment is applied only when LFNST or NSPT is enabled (e.g., when lfnst_idx or nspt_idx is not equal to zero).

In some embodiments, the signaling of the transform index (and/or intra mode offset) is applied only for the luma component, e.g., regardless of whether single tree or dual tree is applied.

In some embodiments, the signaling of the transform index (and/or intra mode offset) is applied only for the frames in the bottom (<=N) temporal layers, where N is a positive integer number. For example, when N equals to 1, the proposed multiple-set selection approach is applied only for the frames whose temporal layer id equals to 0 or 1.

In some embodiments, the signaling of the transform index (and/or intra mode offset) is applied only for directional intra prediction modes.

Figure 6B:
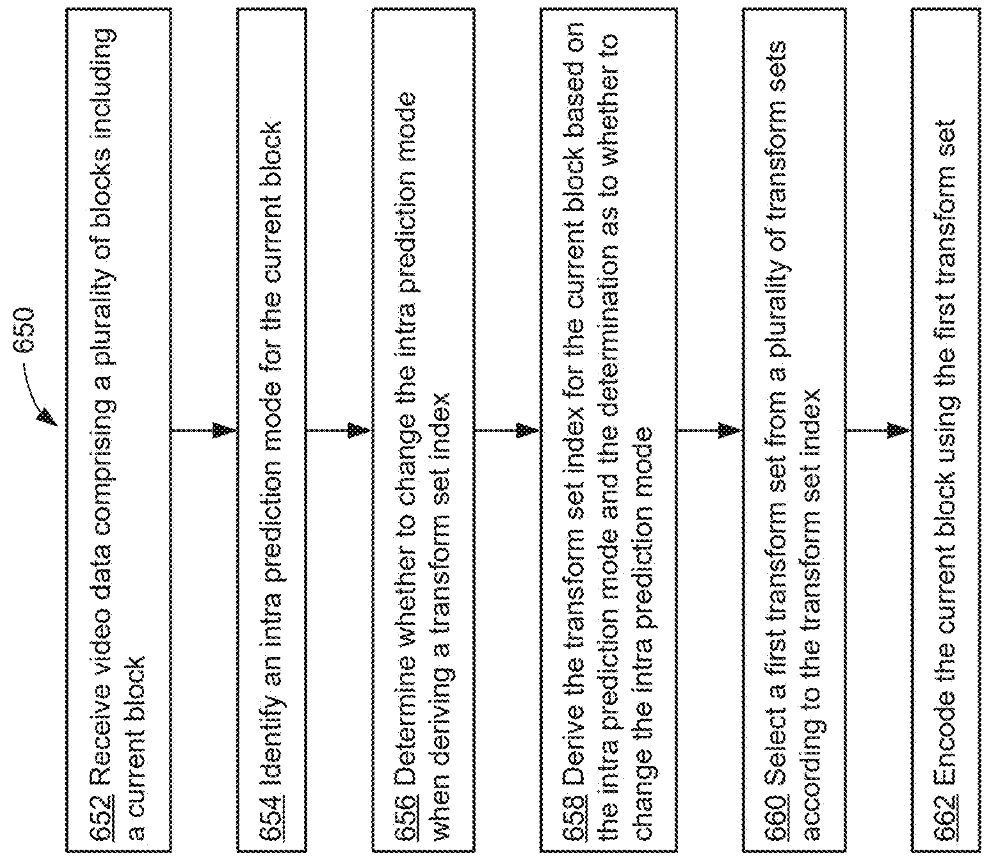
FIG. 6B illustrates an example video encoding process in accordance with some embodiments.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data comprising a plurality of blocks including a current block. The system identifies (654) an intra prediction mode for the current block. The system determines (656) whether to change the intra prediction mode when deriving a transform set index. The system derives (658) the transform set index for the current block based on the intra prediction mode and the determination as to whether to change the intra prediction mode. The system selects (660) a first transform set from a plurality of transform sets according to the transform set index. The system encodes (662) the current block using the first transform set. As described previously, the encoding process may mirror the decoding processes described herein (e.g., transform set selection). For brevity, those details are not repeated here.

Although FIGS. 6A and 6B illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

In some embodiments, a multiple transform set selection method is applied for intra blocks coded with LFNST/NSPT. In this way, CUs coded with decoder-side intra mode derivation (DIMD), template-based intra mode derivation (TIMD), MIP, spatial geometric partition mode (SGPM), enhanced intra prediction (EIP), and IntraTMP modes can use an alternative LFNST/NSPT transform set. The transform set selection may be signaled in the bitstream.

In some embodiments, a coding component is configured to select, for CUs coded with DIMD, TIMD, MIP, SGPM EIP, and IntraTMP, a LFNST/NSPT transform set from 2 or more candidate sets. For example, if the current block is coded with DIMD, TIMD, MIP, SGPM, ITMP and LFNST/NSPT is used, an additional more bin is used to indicate whether the first or second candidate transform set is selected. In some embodiments, the first candidate transform set is the default transform set (e.g., is the same as the current ECM design). In some embodiments, the second candidate is derived by a DIMD process with neighboring reconstructed pixels. For example, if a TIMD coded block applies fusion, the second TIMD IPM may be used to derive the second candidate set. As another example, for an SGPM coded block, the two IPM that SGPM uses may be used to derive the second candidate set. Simulation data on ECM-11 software with common test conditions has shown that selecting between two transform sets for LFNST/NSPT improves coding of the luma (Y) component by 0.08%. Simulation data on ECM-14 software with common test conditions has shown that selecting between two transform sets for LFNST/NSPT improves coding of the luma (Y) component by 0.14%.

(A1) In one aspect, some embodiments include a method (e.g., the method 600) of video decoding. In some embodiments, the method is performed at a computing system (e.g., the server system 112, the source device 102, or the electronic device 120) having memory and one or more processors. In some embodiments, the method is performed at a coding module (e.g., the coding module 320). In some embodiments, the method is performed by executing instructions stored in the memory (e.g., the memory 314) of the one or more computing systems. The method includes: (i) receiving a video bitstream (e.g., a coded video sequence) comprising a current block and a syntax element; (ii) identifying an intra prediction mode for the current block; (iii) parsing the syntax element to determine whether to change the intra prediction mode when deriving a transform set index; (iv) deriving the transform set index for the current block based on the intra prediction mode and the parsed syntax element; (v) selecting a first transform set from a plurality of transform sets according to the transform set index; and (vi) reconstructing the current block using the first transform set. For example, when selecting a transform set for a residual block, multiple transform sets may be available and an index of the selected transform set (tx_set_idx) may be derived based on an intra prediction mode (e.g., correlated via a lookup table) and a signaled offset to the intra prediction mode. In some embodiments, the first transform set is selected using a look-up table stored at a decoder component.

(A2) In some embodiments of A1, the syntax element indicates an intra mode offset, and the transform set index is derived by adding the intra mode offset to the intra prediction mode. For example, a final intra prediction mode (N+M) is derived based on a signaled offset N and the intra prediction mode M, where M and/or N may be a negative or positive integer number. Based on the final intra prediction mode, the transform set index is derived (e.g., using a predefined mapping table, such as Table 2). In some embodiments, the syntax element indicates which intra prediction mode to use from a list of intra prediction modes. For example, the syntax element may indicate whether to use the first intra prediction mode (e.g., the highest ranked mode) in a ranked list of intra prediction modes or a second intra prediction mode (e.g., the second highest ranked mode) in the ranked list.

(A3) In some embodiments of A1 or A2, the syntax element indicates what change to make to the intra prediction mode, and a number of allowed changes is restricted to a particular value. For example, the allowed number of signaled offsets is limited to R, where R is a positive integer number. For example, when R is equal to 3, there are three allowed offsets, resulting in the selection of transform set is limited to three transform sets. In some embodiments, the syntax element indicates which entry to use from a ranked list of intra prediction modes for the current block.

(A4) In some embodiments of A3, the particular value is 2. In some embodiments, the particular value is 3. In some embodiments, the particular value is 1. In some embodiments, an indicator value of 0 corresponds to the highest ranked intra prediction mode, and an indicator value of 2 (or 1) corresponds to the second highest ranked intra prediction mode.

(A5) In some embodiments of A3, the particular value adaptively determined based on coding information. For example, the allowed number R may be adaptively determined based on coding information, such as the intra prediction mode, a transform split mode/depth of the current block, transform coefficient values, a last nonzero position (or end-of-bitstream (EOB) value), a number of nonzero transform coefficients, and/or a block size (e.g., block width and/or height) of the current block. For example, the particular value may be 1 for normal intra prediction modes and 2 for abnormal intra prediction modes (e.g., DIMD, TIMD, MIP, SGPM and/or ITMP).

(A6) In some embodiments of any of A1-A5, the syntax element indicates a first change for the intra prediction mode from a predefined set of changes. For example, a signaled offset may be selected from a predefined set. For example, when the set is {−2, 0, 2}, the signaled offset value limits the selection of transform set to its neighboring transform set (with offset equal to −2 or +2), or not use an offset (with offset equal to 0). In some embodiments, the predefined set of changes has a step size greater than 1 (e.g., a step size of 2, 3, or 4). Having a step size greater than 1 improves the diversity of the intra prediction mode options, thereby improving the coding accuracy.

(A7) In some embodiments of A6, the predefined set of changes is based on coding information. For example, The predefined set may be adaptively determined based on coding information, such as the intra prediction mode, a transform split mode/depth of the current block, transform coefficient values, a last nonzero position (or EOB), a number of nonzero transform coefficients, and/or a block size (e.g., block width and/or height) of the current block.

(A8) In some embodiments of any of A1-A7, the intra prediction mode is in a range of [−15, 81] inclusive. For example, the intra prediction mode is one of the modes shown in Table 2.

(A9) In some embodiments of any of A1-A8, the method further comprises, after applying a change to the intra prediction mode indicated by the syntax element and prior to deriving the transform set index, mapping the intra prediction mode to a final intra prediction mode, where the transform set index is derived using the final intra prediction mode. For example, the intra prediction mode may be altered before mapping to the transform set to avoid duplicated mapping to the same transform set. For example, the intra prediction mode may be mapped to the final intra prediction mode to avoid the intra prediction mode before and after the change having a same transform mapping (e.g., both intra prediction modes mapping to a transform set value of 2). In some embodiments, the intra prediction mode is mapped to the final intra prediction mode after applying the change to the intra prediction mode indicated by the syntax element.

(A10) In some embodiments of A9, the intra prediction mode is mapped to the final intra prediction mode when the intra prediction mode has a value in a range of [−15, −1] or in a range of [66, 81]. For example, when the intra mode is between [−15, −1] and the offset is −2, the final intra mode may be derived as 3. In some embodiments, the intra prediction mode is not mapped to the final intra prediction mode when the intra prediction mode has a value outside of the range of [−15, −1] and [66, 81]. In some embodiments, the intra prediction mode is mapped to the final intra prediction mode in accordance with a determination that the intra prediction mode has a value in the range of [−15, −1] or [66, 81]. In some embodiments, the intra prediction mode is selectively mapped to the final intra prediction mode based on the value of the intra prediction mode (and optionally a value of the syntax element). Selectively mapping the intra prediction mode to the final intra prediction mode improves diversity in the potential transform sets, thereby improving coding accuracy.

(A11) In some embodiments of A9 or A10, the intra prediction mode is selectively mapped to the final intra prediction mode when applying the change to the intra prediction mode indicated by the syntax element causes the intra prediction mode to switch between a non-directional intra mode and a directional intra prediction mode. For example, the intra mode is altered before mapping to the transform set to keep a non-directional intra mode as a non-directional transform set. For example, when the existing intra mode is equal to 0 and the offset is −2, the final intra mode may be derived as 1. As another example, when the existing intra mode is equal to 1 and the offset is −2, the final intra mode may be derived as 0. In some embodiments, the computing system determines whether applying the change indicated by the syntax element causes the intra prediction mode to switch between a non-directional intra mode and a directional intra prediction mode; and, in accordance with a determination that applying the change causes the intra prediction mode to switch, the computing system maps the changed intra prediction mode to the final intra prediction mode.

(A12) In some embodiments of any of A1-A11, reconstructing the current block using the first transform set comprises applying an LFNST or an NSPT. In some embodiments, the syntax element is only signaled in the video bitstream when an LFNST or NSPT is enabled for the current block. For example, the signaled intra mode offset is applied for both NSPT and LFNST. In some embodiments, the syntax element is selectively parsed based on whether an LFNST or NSPT is applied for the current block.

(A13) In some embodiments of any of A1-A12, the syntax element is entropy coded. In some embodiments, the syntax element is bypass coded. In some embodiments, the syntax element is entropy encoded using a single context. In some embodiments, a signaled intra mode offset is entropy coded. In some embodiments, the entropy coding of intra mode is contexed coded and the context is built based on whether the current slice is dual tree or single tree.

(A14) In some embodiments of any of A1-A13, the syntax element is signaled for one or more luma blocks and is not signaled for one or more chroma blocks. In some embodiments, the syntax element is selectively parsed based whether the current block is a luma block or a chroma block. In some embodiments, the first transform set is selected by mapping the intra prediction mode to a transform set from the plurality of transform sets when the syntax element is not signaled (e.g., the first transform set depends on only the intra prediction mode when the syntax element is not signaled).

(A15) In some embodiments of any of A1-A14, the syntax element is signaled for the current block only when a non-separable transform is applied for the current block. For example, the signaling of the tx_set_idx or intra mode offset is applied only when LFNST or NSPT is enabled (e.g., when lfnst_idx or nspt_idx is not equal to zero). In some embodiments, the syntax element is selectively signaled/parsed when an LFNST or NSPT is applied for the current block.

(A16) In some embodiments of any of A1-A14, the syntax element is signaled for the current block only when a temporal layer identifier for the current block meets one or more criteria. For example, the signaling of the tx_set_idx or intra mode offset is applied only for the frames in the bottom (<=N) temporal layers, where N is a positive integer number. For example, when N equals to 1, the proposed multiple-set selection approach is applied only for the frames whose temporal layer id equals to 0 or 1. In some embodiments, the syntax element is selectively signaled/parsed when a current frame containing the current block has a temporal layer identifier that is less than (or equal to) a predefined threshold.

(A17) In some embodiments of any of A1-A14, the syntax element is signaled for the current block only when the intra prediction mode is a directional intra prediction mode. For example, the signaling of the tx_set_idx or intra mode offset is applied only for directional intra prediction modes. In some embodiments, the syntax element is selectively signaled/parsed when the intra prediction mode for the current block is a directional intra prediction mode. In some embodiments, the syntax element is signaled/parsed for the current block only when a DIMD, TIMD, MIP, SGPM or ITMP mode is applied to the current block.

(B1) In another aspect, some embodiments include a method (e.g., the method 650) of video encoding. In some embodiments, the method is performed at a computing system (e.g., the server system 112) having memory and one or more processors. In some embodiments, the method is performed at a coding module (e.g., the coding module 320). The method includes: (i) receiving video data (e.g., a source video sequence) comprising a plurality of blocks (e.g., corresponding to a set of pictures) including a current block; (ii) identifying an intra prediction mode for the current block; (iii) determining whether to change the intra prediction mode when deriving a transform set index; (iv) deriving the transform set index for the current block based on the intra prediction mode and the determination as to whether to change the intra prediction mode; (v) selecting a first transform set from a plurality of transform sets according to the transform set index; and (vi) encoding the current block using the first transform set.

(B2) In some embodiments of B1, the method further comprises signaling the determination as to whether to change the intra prediction mode in a video bitstream.

(B3) In some embodiments of B1 or B2, the method further comprises any of A1-A17 above.

(C1) In another aspect, some embodiments include a method of processing visual media data. In some embodiments, the method is performed at a computing system (e.g., the server system 112) having memory and one or more processors. In some embodiments, the method is performed at a coding module (e.g., the coding module 320). The method includes: (i) obtaining a source video sequence that comprises a plurality of frames; and (ii) performing a conversion between the source video sequence and a video bitstream of visual media data according to a format rule, where the video bitstream comprises a current block and a syntax element, and the format rule specifies that: (a) a transform set index is to be derived for the current block based on an intra prediction mode for the current block and parsed syntax element; (b) a first transform set is to be selected from a plurality of transform sets according to the transform set index; and (c) the current block is to be reconstructed using the first transform set.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A17, B1-B3, and C1 above). In yet another aspect, some embodiments include a non-transitory computer-readable storage medium storing one or more sets of instructions for execution by control circuitry of a computing system, the one or more sets of instructions including instructions for performing any of the methods described herein (e.g., A1-A17, B1-B3, and C1 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

As used herein, the term “when” can be construed to mean “if” or “upon” or “in response to determining” or “in accordance with a determination” or “in response to detecting” that a stated condition precedent is true, depending on the context. Similarly, the phrase “if it is determined [that a stated condition precedent is true]” or “if [a stated condition precedent is true]” or “when [a stated condition precedent is true]” can be construed to mean “upon determining” or “in response to determining” or “in accordance with a determination” or “upon detecting” or “in response to detecting” that the stated condition precedent is true, depending on the context. As used herein, N refers to a variable number. Unless explicitly stated, different instances of N may refer to the same number (e.g., the same integer value, such as the number 2) or different numbers.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

- receiving a video bitstream comprising a current block and a syntax element, wherein the syntax element indicates an intra mode offset and is signaled for the current block when a low-frequency non-separable transform (LFNST) or non-separable primary transform (NSPT) is applied for the current block;
- identifying an intra prediction mode for the current block;
- parsing the syntax element to determine the intra mode offset, wherein the intra mode offset is added to the intra prediction mode to obtain a final intra prediction mode;
- deriving a transform set index for the current block based on the final intra prediction mode;
- selecting a first transform set from a plurality of transform sets according to the transform set index; and
- reconstructing the current block using the first transform set.

2. The method of claim 1, wherein the intra prediction mode is in a range of [−15, 81] inclusive.

3. The method of claim 1, further comprising, after obtaining the final intra prediction mode and prior to deriving the transform set index, mapping the final intra prediction mode to a mapped intra prediction mode, wherein the transform set index is derived using the mapped intra prediction mode.

4. The method of claim 3, wherein the final intra prediction mode is mapped to the mapped intra prediction mode when the final intra prediction mode has a value in a range of [−15,−1] or in a range of [66, 81].

5. The method of claim 1, wherein reconstructing the current block using the first transform set comprises applying a low-frequency non-separable transform (LFNST) or a non-separable primary transform (NSPT).

6. The method of claim 1, wherein the syntax element is entropy coded.

7. The method of claim 1, wherein the syntax element is signaled for one or more luma blocks and is not signaled for one or more chroma blocks.

8. The method of claim 1, wherein the syntax element is signaled for the current block only when a temporal layer identifier for the current block meets one or more criteria.

9. The method of claim 1, wherein the syntax element is signaled for the current block only when the intra prediction mode is a directional intra prediction mode.

10. A method of video encoding performed at a computing system having memory and one or more processors, the method comprising:

- receiving video data comprising a plurality of blocks including a current block;
- identifying an intra prediction mode for the current block;
- determining whether to apply an intra mode offset when deriving a transform set index based at least in part on whether a low-frequency non-separable transform (LFNST) or non-separable primary transform (NSPT) is to be applied for the current block;
- deriving the transform set index for the current block based on the intra prediction mode and the determination as to whether to apply the intra mode offset;
- selecting a first transform set from a plurality of transform sets according to the transform set index; and
- encoding the current block using the first transform set.

11. The method of claim 10, further comprising signaling whether to change the intra prediction mode in a video bitstream.

12. A non-transitory computer-readable storage medium storing one or more instructions and a video bitstream that is generated by a video encoding method, the one or more instructions when executed by a processor, cause a computing system to perform the video encoding method, the video encoding method comprising:

- receiving video data comprising a plurality of blocks including a current block;
- identifying an intra prediction mode for the current block;
- determining whether to apply an intra mode offset when deriving a transform set index based at least in part on whether a low-frequency non-separable transform (LFNST) or non-separable primary transform (NSPT) is to be applied for the current block;
- deriving the transform set index for the current block based on the intra prediction mode and the determination as to whether to apply the intra mode offset;
- selecting a first transform set from a plurality of transform sets according to the transform set index;
- encoding the current block using the first transform set; and,
- transmitting the video bitstream including the encoded current block and an indicator indicating whether to change the intra prediction mode.

13. The non-transitory computer-readable storage medium of claim 12, wherein the indicator is entropy coded.

14. The method of claim 10, further comprising signaling a syntax element indicating the intra mode offset, wherein the syntax element is entropy coded.

15. The method of claim 10, wherein the intra mode offset is selected from a predefined set of offsets having a step size greater than 1.

16. The method of claim 10, wherein the transform set index is derived by mapping a final intra prediction mode using a predefined mapping table, wherein the final intra prediction mode is derived by applying the intra mode offset to the intra prediction mode.

17. The method of claim 1, wherein the intra mode offset is selected from a predefined set of offsets having a step size greater than 1.

18. The method of claim 17, wherein the predefined set of offsets is {−2, 0, 2}.

19. The method of claim 1, wherein the transform set index is derived by mapping the final intra prediction mode using a predefined mapping table.

20. The method of claim 1, wherein the syntax element is entropy coded using a context that is based on whether a current slice is coded using a dual tree or a single tree.

* * * * *